US008693814B2

(12) United States Patent
Rosenberg et al.

(10) Patent No.: US 8,693,814 B2
(45) Date of Patent: Apr. 8, 2014

(54) FLEXIBLE OPTICAL INTERCONNECT

(75) Inventors: Paul Kessler Rosenberg, Sunnyvale, CA (US); Michael Renne Ty Tan, Menlo Park, CA (US); Sagi Varghese Mathai, Berkeley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 843 days.

(21) Appl. No.: 12/922,092

(22) PCT Filed: Mar. 28, 2008

(86) PCT No.: PCT/US2008/058769
§ 371 (c)(1),
(2), (4) Date: Sep. 10, 2010

(87) PCT Pub. No.: WO2009/120218
PCT Pub. Date: Oct. 1, 2009

(65) Prior Publication Data
US 2011/0013866 A1     Jan. 20, 2011

(51) Int. Cl.
G02B 6/12     (2006.01)
G02B 6/10     (2006.01)

(52) U.S. Cl.
USPC ............................. 385/14; 385/125; 385/129

(58) Field of Classification Search
None
See application file for complete search history.

(56) References Cited

U.S. PATENT DOCUMENTS 3,157,847 A    11/1964   Williams
5,018,809 A    5/1991    Shin
5,061,029 A    10/1991   Ishikawa
5,375,184 A    12/1994   Sullivan
5,850,498 A    12/1998   Shacklette
5,974,214 A    10/1999   Shacklette
6,088,498 A    7/2000    Hibbs-Brenner
6,619,858 B1   9/2003    Lytel
6,684,007 B2   1/2004    Yoshimura
6,793,410 B2   9/2004    Nakanishi et al.
6,839,478 B2 * 1/2005    Huber et al. ............... 385/16

(Continued)

FOREIGN PATENT DOCUMENTS

CA    2344455       3/2000
DE    198 42 694    4/2000

(Continued)

OTHER PUBLICATIONS

HPDC, International Search Report and Written Opinion, PCT/US2008/058769, Nov. 5, 2008.

Primary Examiner — Tina Wong

(57) ABSTRACT

A flexible optical interconnect and method of forming the interconnect is disclosed. The optical interconnect includes a waveguide base formed from a flexible dielectric material. A three-sided channel is formed in the flexible material. Each side of the channel is coated with a reflective metallic coating. A cover piece is formed from the flexible material and coated with a reflective metallic coating on an underside. The cover piece is coupled to the waveguide base to form a flexible optical bus having at least one hollow metallized waveguide. The hollow metallized waveguide is configured to carry an optical signal. A transverse slot is formed in the cover piece and the waveguide base to form an aperture bisecting the hollow metallized waveguide to enable the optical signal to be detected and/or redirected.

23 Claims, 7 Drawing Sheets

(56) References Cited

U.S. PATENT DOCUMENTS

| | | |
|---|---|---|
| 7,113,682 B2 * | 9/2006 | Sfez .................. 385/129 |
| 7,499,615 B2 * | 3/2009 | Tan et al. .............. 385/52 |
| 7,835,602 B2 * | 11/2010 | Tan et al. .............. 385/14 |
| 8,260,101 B2 * | 9/2012 | Mathai et al. .......... 385/44 |
| 8,503,848 B2 * | 8/2013 | Mathal et al. ......... 385/129 |
| 2003/0035613 A1 | 2/2003 | Huber et al. |
| 2005/0089262 A1 * | 4/2005 | Jenkins et al. ......... 385/14 |
| 2006/0104592 A1 * | 5/2006 | Jenkins et al. ........ 385/140 |
| 2006/0177177 A1 * | 8/2006 | Jenkins et al. ......... 385/33 |
| 2007/0058916 A1 | 3/2007 | Lo et al. |
| 2007/0165980 A1 | 7/2007 | Jenkins et al. |
| 2009/0190880 A1 * | 7/2009 | Hikita et al. .......... 385/14 |

FOREIGN PATENT DOCUMENTS

| | | |
|---|---|---|
| DE | 603 01 553 | 8/2003 |
| JP | 04-281406 | 10/1992 |
| JP | H09-184937 | 7/1997 |
| JP | 2002-182049 | 6/2002 |
| JP | 2003-258364 | 9/2003 |
| JP | 2003-270504 | 9/2003 |
| JP | 2004-294660 | 10/2004 |
| JP | 4294660 | 10/2004 |
| JP | 2005-037533 | 2/2005 |
| JP | 2005-516253 | 6/2005 |
| JP | 2007-033688 | 2/2007 |
| JP | 2007-240867 | 9/2007 |
| WO | WO-03/065091 | 8/2003 |

* cited by examiner

FLEXIBLE OPTICAL INTERCONNECT

BACKGROUND OF THE INVENTION

As computer chip speeds on circuit boards increase to ever faster speeds, a communications bottleneck in inter-chip communication is becoming a larger problem. One likely solution is to use fiber optics to interconnect high speed computer chips. However, most printed circuit boards (PCBs) involve many layers and often require tolerances in their manufacture on the order of a few microns, which is significantly tighter than conventional fiber optic applications. As a result, the physical placement and connection of optical fibers to computer chips can be too inaccurate and time consuming to be widely adopted in circuit board manufacturing processes. Marketable optical interconnects between chips have therefore proven elusive, despite the need for broadband data transfer.

BRIEF DESCRIPTION OF THE DRAWINGS

Features and advantages of the present invention will be apparent from the detailed description that follows, and when taken in conjunction with the accompanying drawings together illustrate, by way of example, features of the invention. It will be readily appreciated that these drawings merely depict exemplary embodiments of the present invention and are not to be considered limiting of its scope, and that the components of the invention, as generally described and illustrated in the figures herein, could be arranged and designed in a wide variety of different configurations. Nonetheless, the present invention will be described and explained with additional specificity and detail through the use of the accompanying drawings, in which.

DETAILED DESCRIPTION OF EXEMPLARY EMBODIMENTS

Figure 1:
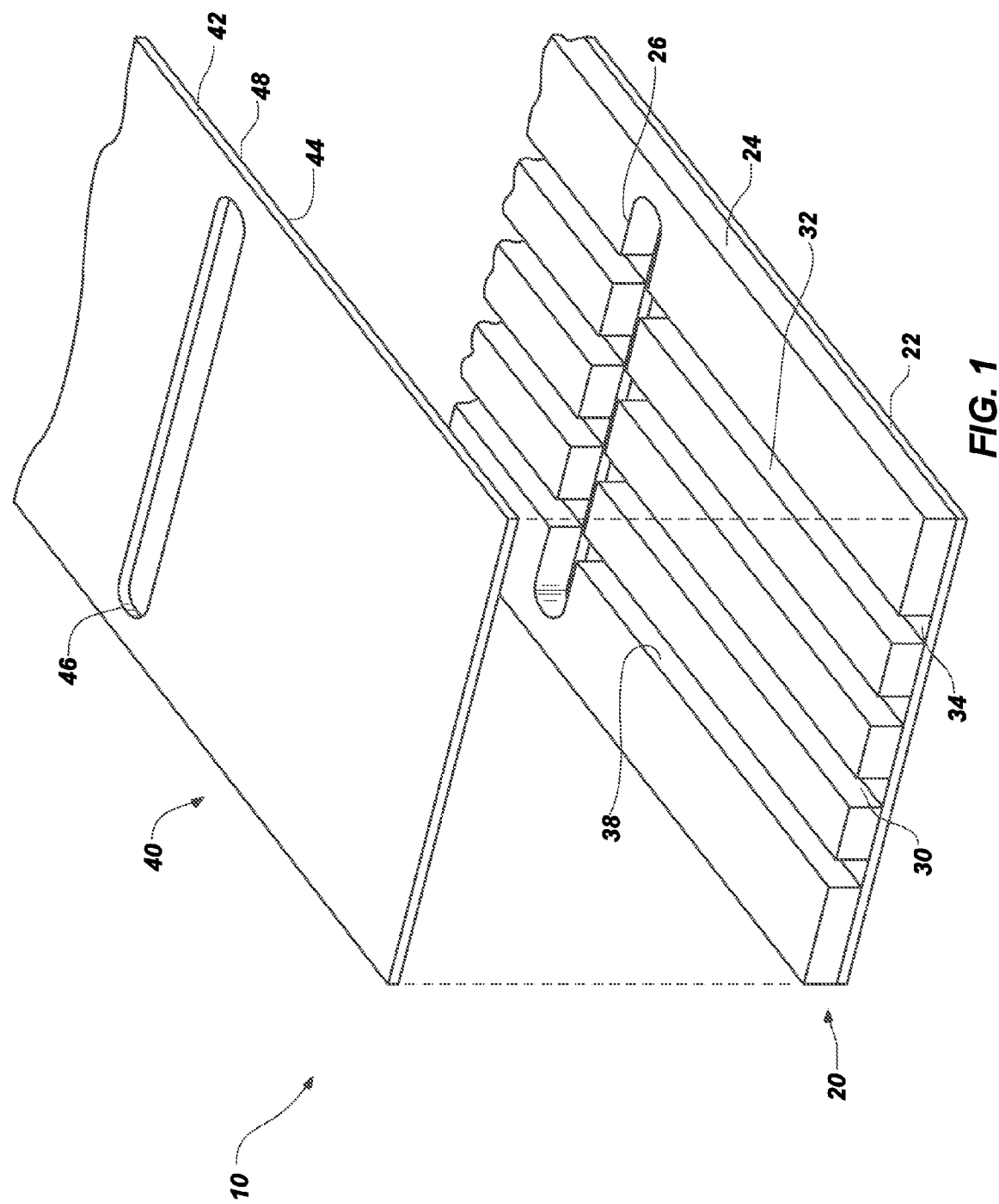
FIG. 1 is a schematic, perspective illustration of a step in the manufacturing process of a flexible optical interconnect, according to an exemplary embodiment of the present invention.

The following detailed description of the invention makes reference to the accompanying drawings, which form a part thereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. As such, the following more detailed description of the exemplary embodiments is not intended to limit the scope of the present invention as it is claimed, but is presented for purposes of illustration only: to describe the features and characteristics of the present invention, and to sufficiently enable one skilled in the art to practice the invention. Accordingly, the scope of the present invention is to be defined solely by the appended claims.

Illustrated in FIGS. 1-7 are various exemplary embodiments of the present invention for a flexible optical interconnect which has, at its core, a plurality of parallel hollow metal waveguides (WG) imbedded in a strip of flexible dielectric material to form a flexible optical bus that can transfer data between computer components and connect several peripherals over the same set of optical waveguides. The flexible optical bus can be configured to carry an optical signal a distance from a few centimeters up to fifty centimeters or more. The bus can be constructed from a flexible polyimide material, such as DuPont's Kapton®, and can be made using standard manufacturing techniques in industrial printed circuit board fabrication. The optical bus can be integrated with additional optical components, such as beamsplitter arrays, lens arrays, and optoelectronic devices to form a flexible optical interconnect capable of establishing optical communication links between multiple circuit boards or other electronic devices.

In one embodiment, the flexible optical interconnect can be constructed by fabricating a series of parallel three-sided channels into a polyimide waveguide base. The channels can be plated with a reflective coating to produce a highly smooth and reflective surface. A cover piece can also be constructed with a reflective coating on its underside. The waveguide base and cover piece can be laminated together to produce a flexible optical bus having a plurality of hollow metal waveguides formed therein and configured to carry an optical signal. Crosswise slots bisecting the hollow metal waveguides can be pre-formed into both the waveguide base and the cover piece before the two components are coupled together. When joined, a base and cover crosswise slot can align to form a transverse slot. Additional features such as locating holes also can be formed into both the waveguide base and cover piece.

A stiffener plate, fabricated from the polyimide or other polymer or metal material, but with a greater thickness than the waveguide base or cover piece, can be added to the flexible optical bus to provide structural support and protection, as well as attachment sites for additional optical components. The stiffener plate can have a series of pre-formed transverse 'through' openings aligned with the transverse slots in the optical bus, so that after attachment the transverse slots and transverse openings line up to form passageways perpendicular to the plane of the hollow metal waveguides that can be used to obtain tapped optical signals.

Alignment features, such as holes and posts, can be formed in the mating portions of the stiffener plate and the flexible circuit waveguide, or optical bus, in order to achieve precise alignment between these structural components. These and other precision alignment features, such as recesses or pockets formed into the sides of the transverse openings, can be used to facilitate accurate placement of additional optical and electrical components that can be attached in later stages of assembly.

Tapping the optical signal can be accomplished by inserting an array of beamsplitters into the transverse slot formed in the flexible optical bus until the beamsplitter array intersects the path of the optical beam traveling through the optical waveguides. The beamsplitters reflect a portion of the optical signal out of the plane of the hollow metal waveguides at a predetermined angle, while allowing the remainder of the optical signal to continue down the optical bus to the next tap location. The portion of the reflected optical signal compared to the transmitted signal, or reflectivity/transmissivity ratio, can be predetermined by adjusting the optical properties of the beamsplitters. Furthermore, if the flexible optical bus is tapped at more than one location, the optical properties of each beamsplitter array can be controlled so that the tapped portions can vary between tap locations along the optical interconnect.

The beamsplitter arrays can be inserted in the transverse slots first by mounting each beamsplitter array into a tap frame that is formed in or attached to a tap base strip. The tap base strip, tap frames, and beamsplitter arrays can be assembled together to form a tap assembly which can be attached to the side of the flexible optional bus opposite the stiffener plate. The tap base strip can be pressed flush against the outer surface of the optical bus, with each tap frame and beamsplitter array configured to slide into a transverse slot until the beamsplitter array intersects the optical beam.

After the beamsplitter arrays have been installed, the partially-assembled optical interconnect can be orientated so that the tap assembly is positioned as the bottom or base layer, followed upwards in turn by the optical bus and the stiffener plate. In this arrangement, the optical signal passing through the plurality of hollow metal waveguides will contact the beamsplitter arrays and be reflected upwards through the transverse openings in the stiffener plate.

Lens arrays can be positioned in specially configured recesses, or pockets, formed in the transverse openings in the stiffener plate. The lens arrays can serve to condition the reflected portions of the optical signal passing upwards through each transverse opening, either through focusing the individual light beams, collimating the separate wavelengths of light within the light beams, or both. The lens arrays can be configured to fit inside the pockets at the precise depth and to be passively aligned in position to intersect the reflected optical signal as it passes upwards. The lens arrays can be sized and shaped to fit inside the pockets in the stiffener plate without extending above the top surface of the stiffener plate.

The flexible optical interconnect of the present invention can include optoelectronic (OE) assemblies mounted to the top surface of the stiffener plate above the beamsplitter and lens arrays, so that the portions of the optical signal reflected by the beamsplitters are coupled into the OE assemblies. These assemblies can include both light detector arrays configured to detect and capture the tapped portion of the optical signal out of the flexible optical bus, as well as light emitter arrays configured to transmit an optical signal into the flexible optical bus. Additionally, the OE assemblies can be formed from flexible circuit board material, and can include integrated electronic circuits and IO contacts fabricated into flex tails.

The OE assemblies can be attached and passively aligned using locating holes or slots fabricated into the top surface of the stiffener plate, and can also be actively aligned using vision systems and other methods.

As will be recited here and throughout the more detailed description, the flexible optical interconnect of the present invention confers several significant performance benefits over prior related art. For instance, a flexible optical interconnect provides vastly increased bandwidth over the flexible solid-wire interconnects currently used in computers today. In moving to an optical communications medium, designers can reduce the developing communications bottleneck in inter-chip communications in modern high-speed devices.

The present invention's application of hollow metal optical waveguides encased in a flexible substrate offers significant improvement over optical waveguides with solid polymer cores. Solid core waveguides can be flexible, but rapidly degrade the power of optical signal. The 5 cm to 50 cm range of the present invention is significantly greater than that permitted by solid core waveguides, and allows computer engineers to configure the optical circuits without undue restrictions to chip and circuit board placement. It is also easier to tap a portion of the optical signal from a hollow waveguide than it is to tap a polymer or glass solid core waveguide, and there is less parasitic loss in the transmitted optical signal.

The flexible optical interconnect of the present invention offers further improvements in component placement and assembly. The flexible optical interconnect of the present invention can overcome existing board-mounted, optical interconnect requirements that necessitate that the circuit boards to which they connect are aligned one to another to very close tolerances. In contrast, the present invention provides a flexible connection between rigid printed circuit board (PCB)-based electronic components that can compensate for misalignment between the two devices.

Additionally, all the major components of the present invention, including the electronic devices and circuits fabricated into the flexible OE assemblies, can be made from the same flexible polyimide material and share the same coefficient of thermal expansion (CTE). As a result, relative movement between components, or between a component and the attached electronic device, is substantially reduced during thermal cycling. System integrity and performance are better maintained over time as both the electronic device and optical interconnect expand and shrink together.

Another advantage of the present invention is its compatibility with current, high volume manufacturing methods, which offer the precise control over dimensional tolerances of the pathways and surface finish of the reflective surfaces required to form hollow-metal waveguides capable of transporting an optical signal over an appreciable distance. The present invention greatly improves on the expensive and time-consuming optical circuit manufacturing techniques that involve physically attaching and aligning pre-manufactured optical fibers and circuits on the PCB. Furthermore, the capability of using high volume manufacturing methods allows both optical and electronic circuits to be integrated into the same flexible substrate, expanding the potential applications of the device.

The following detailed description and exemplary embodiments of the invention will be best understood by reference to the accompanying drawings, wherein the elements and features of the invention are designated by numerals throughout.

Illustrated FIG. 1 is a schematic, perspective representation of one step in the manufacturing process of an embodiment of the present invention. In this embodiment, the flexible optical interconnect can be constructed by forming a waveguide base 20 from one or more layers of flexible dielectric material. The material for the waveguide base can be a flexible dielectric polyimide, such as DuPont's Kapton®, or other similar PCB base material such as liquid crystal polymer (LCP), flame retardant 4 (FR4), paper, etc., that can be formed into a flexible strip having the length of the flexible optical interconnect. The waveguide base 20 can have multiple layers, such as a base layer 22 and a channel layer 24, and each layer can be metallized or covered with a metallic coating on one or both sides before being coupled or laminated together to form a sandwich structure having several dielectric and metallic layers.

A series of parallel three-sided channels 30 can be formed into the waveguide base 20 using standard industrial techniques in printed circuit board fabrication. For instance, a chemical etch process can be used to etch grooves from the top of the channel layer 24 down to the metallized base layer 22. The grooves can be formed with a width equal to the thickness of the channel layer, resulting in a series of parallel channels 30 with sides 32 and bottoms 34. In one embodiment, the sides and bottoms can have substantially equal dimensions to form a channel with a square subsection. For example, the channels can have a width and depth of about 150 μm. Alternatively, the sides and bottoms may have unequal dimensions to form a channel with a rectangular subsection. Although the channels 30 illustrated in FIG. 1 are three-sided to form waveguides 28 with square or rectangular cross sections (see FIGS. 2-5), in an alternative embodiment the channels can be made with two sides to form an open-topped V-shaped groove, leading to waveguides with triangular cross-sections.

The channels can be plated with a reflective metallic coating 38, such as a nickel gold or titanium gold alloy and the like, to produce a highly smooth and reflective surface. Other types of metals and dielectrics may also be used to coat the channels to form the highly smooth and reflective surface, as can be appreciated.

A substantially flat cover piece 40 can be fabricated from one or more cover piece layers 42 with a highly smooth and reflective metallic coating 48, such as a nickel gold alloy, on its underside 44. The waveguide base 20 and cover piece 40 can be coupled or laminated together using thermal bonding, adhesive, etc., to produce a flexible optical bus 10 having a plurality of hollow metal waveguides 28 formed therein and configured to carry an optical signal, as further shown in FIG. 2.

Figure 2:
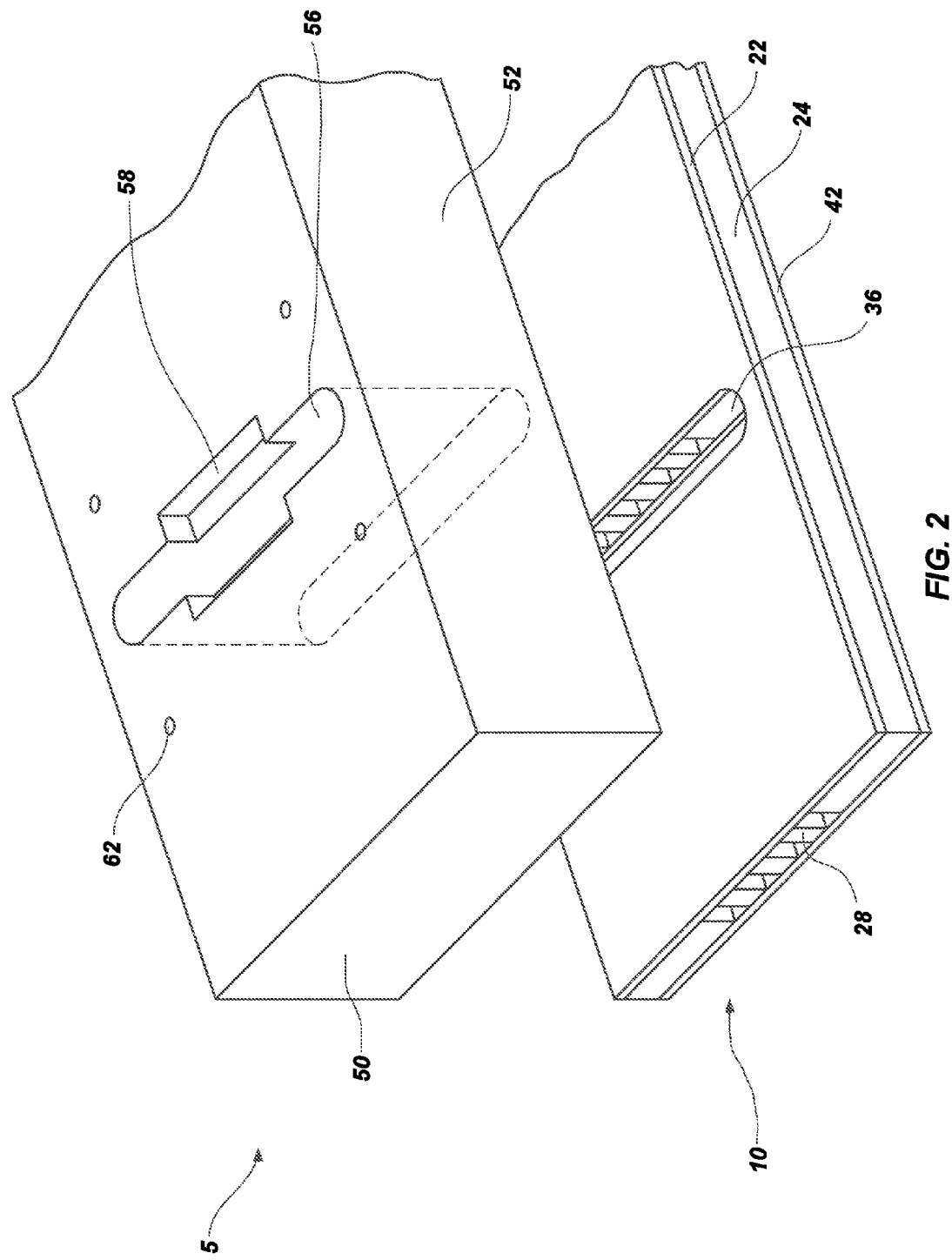
FIG. 2 is a schematic, perspective illustration of an additional step in the manufacturing process of a flexible optical interconnect, in accordance with an exemplary embodiment of the present invention.

Referring back to FIG. 1, crosswise base slots 26 can be formed into the waveguide base 20, and crosswise cover slots 46 can be formed into the cover piece 40 before the two components are coupled together. The crosswise slots can be formed using a mechanical routing process, a chemical etching process, mechanical punching, or any other high volume process technique used in the manufacture of flexible printed circuits. In one embodiment, the slots can be about 1 mm wide. The actual width of the slots is dependent on the hardware mounted in the slots. When joined as illustrated in FIG. 2, the base and cover crosswise slots can align together to form a transverse slot 36 which bisects the series of hollow metal waveguides 28 formed in the optical bus. Additional alignment features such as locating holes and posts also can be formed into both the waveguide base and cover piece to facilitate accurate alignment between these two parts, as well as accurate placement of additional optical and electrical components that can be attached in later stages of assembly.

Further illustrated in FIG. 2 is an additional step in the process of manufacturing an embodiment of the flexible optical interconnect 5 of the present invention. A stiffener plate 50 having a greater thickness than the waveguide base or cover piece can be coupled to the flexible optical bus 10 to provide structural support and protection, as well as attachment sites for additional optical components. The stiffener plate can be fabricated with one or more stiffener plate layers 52 of flexible dielectric material, or as a single metallic plate to allow for attachment of additional optical devices using screws or laser welding.

The stiffener plate 50 can have a series of pre-formed transverse 'through' openings 56 aligned with the transverse slots 36 in the optical bus, so that after attachment the transverse slots and transverse openings line up to form passageways for tapped optical signals. In one embodiment, the transverse slots and openings can align to form vertical passageways that are perpendicular to the horizontal plane of the hollow metal waveguides 28. Alternatively, the transverse openings can be constructed at an angle less than vertical. This can enable attached cards or other devices to be at an angle, thereby decreasing the height of the overall system. The transverse openings in the stiffener plate can have recesses or pockets 58 formed into the sides thereof to accommodate other optical devices, while the top surface 60 of the stiffener plate can be formed with registering features 62 such as locating holes, notches, posts, etc. that can also be used to attach and align additional optical components.

Figure 3:
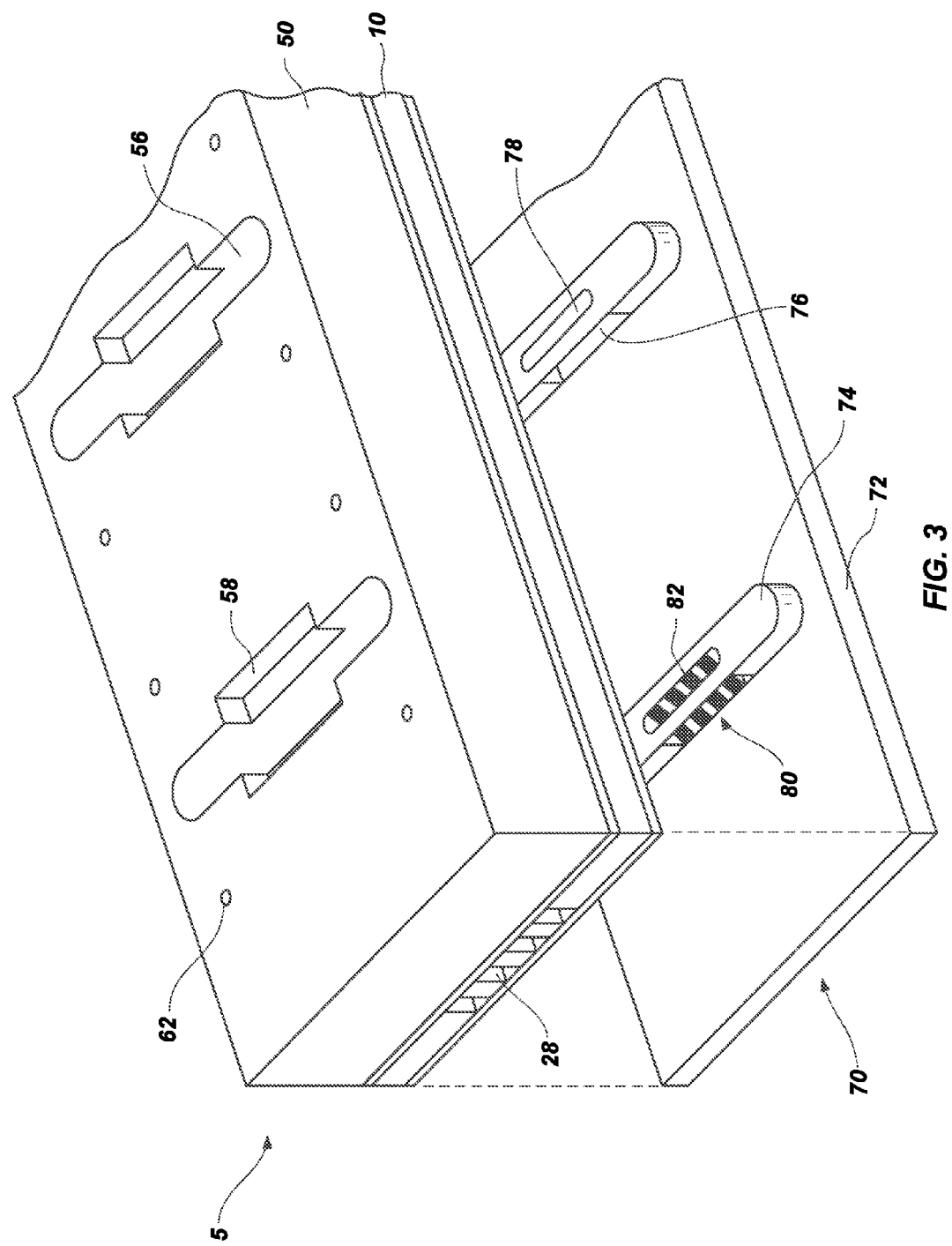
FIG. 3 is a schematic, perspective illustration of an additional step in the manufacturing process of a flexible optical interconnect, in accordance with an exemplary embodiment of the present invention.

FIG. 3 illustrates an additional step in the process of manufacturing an embodiment of the flexible optical interconnect 5 of the present invention. The optical signal traveling through the flexible optical bus 10 can be tapped by inserting an array of beamsplitters 80 into the transverse slot 36 (FIG. 2) formed in the flexible optical bus, from the side opposite the stiffener plate 50, until the beamsplitters 82 intersects the path of the optical beam traveling through the optical waveguides 28. The beamsplitters reflect a portion of the optical signal out of, and perpendicular to, the plane of the hollow metal waveguides, while allowing the remainder of the optical signal to continue down the optical bus to the next tap location. The portion of the reflected optical signal compared to the transmitted signal, or reflectivity/transmissivity ratio, can be predetermined by adjusting the optical properties of the beamsplitters. Furthermore, if the flexible optical bus is tapped at more than one location, the optical properties of each beamsplitter array can be controlled so that the ratio can vary between tap locations along the optical interconnect.

Although the current description of the present invention discusses tapping an optical signal out of the flexible optical bus, it is to be understood that the beamsplitters 82 in a beamsplitter array 80 are able to reflect and transmit optical signals in both directions. Thus, the beamsplitters can be used to couple an optical signal emitted from an optical emitter, such as a laser, into the optical bus as well as couple an optical signal out of the bus to an optical detector, such as a photodetector. Furthermore, a single beamsplitter array can perform both functions simultaneously, which allows full duplex bi-directional communication between two electronic components. It can be further appreciated that the beamsplitter array is replaceable with a turning mirror or reflector array in locations where it is desirable to reflect the entire optical signal into or out of the optical bus.

Tapped optical signals may be directed out of the waveguide in any direction. For example, adjacent beamsplitters may be rotated 90 degrees with respect to each other so that some tapped signals are directed 'up' and some 'down', or at angles less than or greater than 90 degrees. As previously mentioned, the transverse openings in the stiffener plate can also be formed at angles other than vertical to allow the passage of non-perpendicular taped optical beams.

The beamsplitter arrays 80 can be inserted in the transverse slots by mounting each beamsplitter array into a tap frame 74 that is formed in or attached to a tap base strip 72. The tap base strip and frames can be made from flexible molded plastic, stamped metal, lead frames, and the like, and together with the beamsplitter arrays form a tap assembly 70 which can be attached to the surface of the flexible optical bus opposite the stiffener plate 50. The tap frames can have side openings 76 and top openings 78 to allow the optical signal to reach and be reflected by the beamsplitter array contained inside. The tap base strip can be properly aligned and pressed flush against the outer surface of the optical bus, causing each tap frame and beamsplitter array to slide into a transverse slot and reach a depth where the beamsplitter array intersects the optical beam. Tap frames 74 containing the beamsplitter arrays 80 can also be affixed to the flexible optical bus 10 individually.

Both the stiffener plate 50 and the tap assembly 70 can be coupled or laminated with the flexible optical bus 10 using thermal bonding, adhesives, etc., or any other bonding technique used in the manufacture of flexible printed circuits.

After the tap assembly 70 has been coupled to the flexible optical bus 10 and the beamsplitter arrays inserted into the transverse slots to the appropriate depth, the partially-assembled optical interconnect 5 can be orientated so that the tap assembly is positioned as the bottom or base layer, followed upwards in turn by the optical bus and the stiffener plate 50. In this arrangement, as shown in FIG. 4, the optical signal passing through the plurality of hollow metal waveguides 28 will contact the beamsplitter arrays and be reflected upwards through the transverse openings 56 in the stiffener plate.

Figure 4:
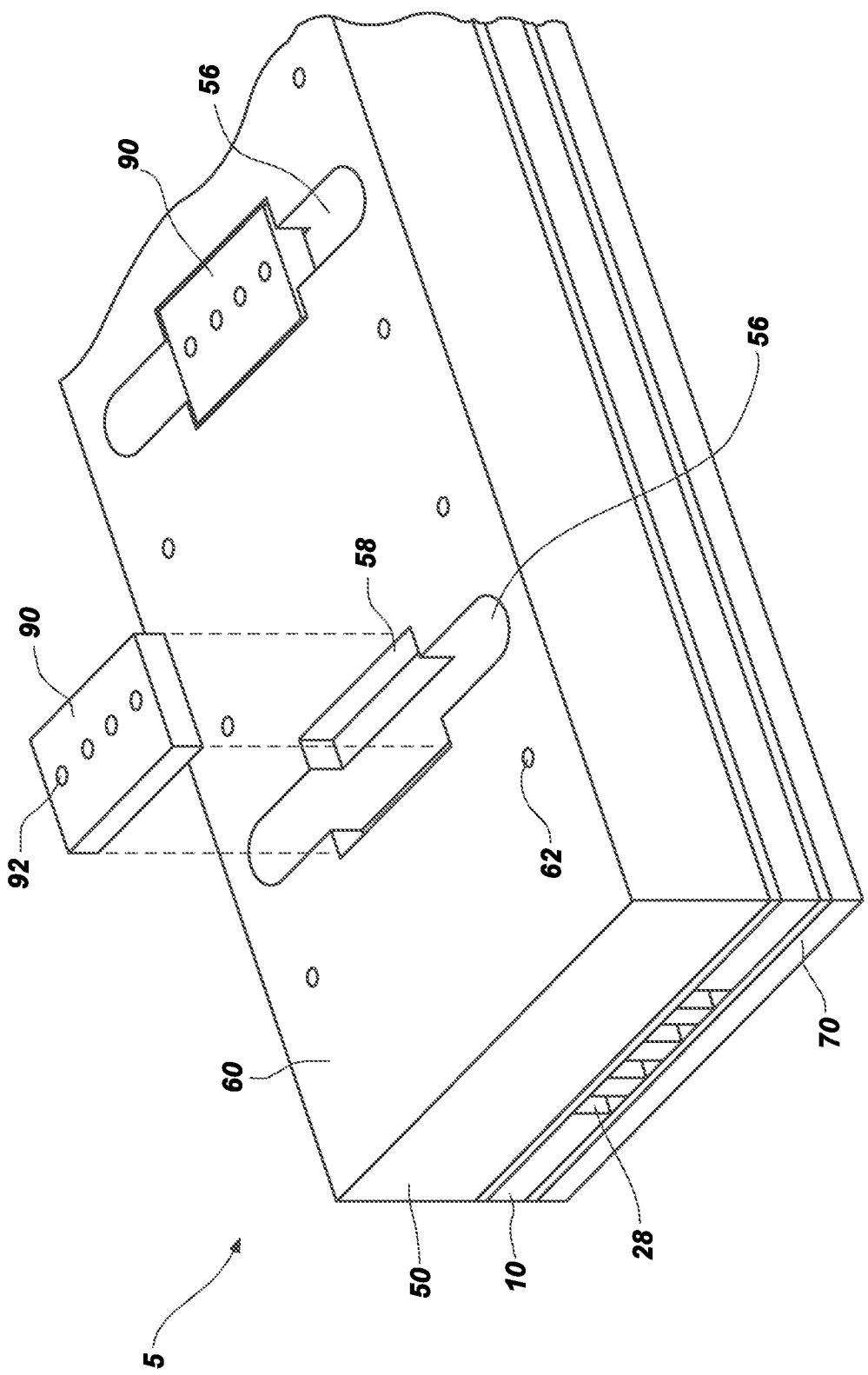
FIG. 4 is a schematic, perspective illustration of an additional step in the manufacturing process of a flexible optical interconnect, in accordance with an exemplary embodiment of the present invention.

In accordance with the embodiment of the present invention illustrated in FIG. 4, lens array 90 can be positioned in specially configured recesses, or pockets 58, formed in the transverse openings 56 in the stiffener plate 50. The lenses 92 in each lens array can be used to condition the reflected portions of the optical signal as it passes through each transverse opening. For example, the lenses can be used for focusing the individual light beams, collimating the separate wavelengths of light within the light beams, or both.

The pockets 58 can be configured to seat the lens arrays 90 at a depth to capture the optical beam as it passes through the transverse opening 56. When seated, the lens arrays can be passively aligned to the beamsplitter arrays below through registration with alignment pins, notches, the walls of the pocket, etc, or may be configured for active or vision-aided alignment. Furthermore, the lens arrays can be sized and shaped to fit inside the pockets without extending above the top surface 60 of the stiffener plate 50.

Figure 5:
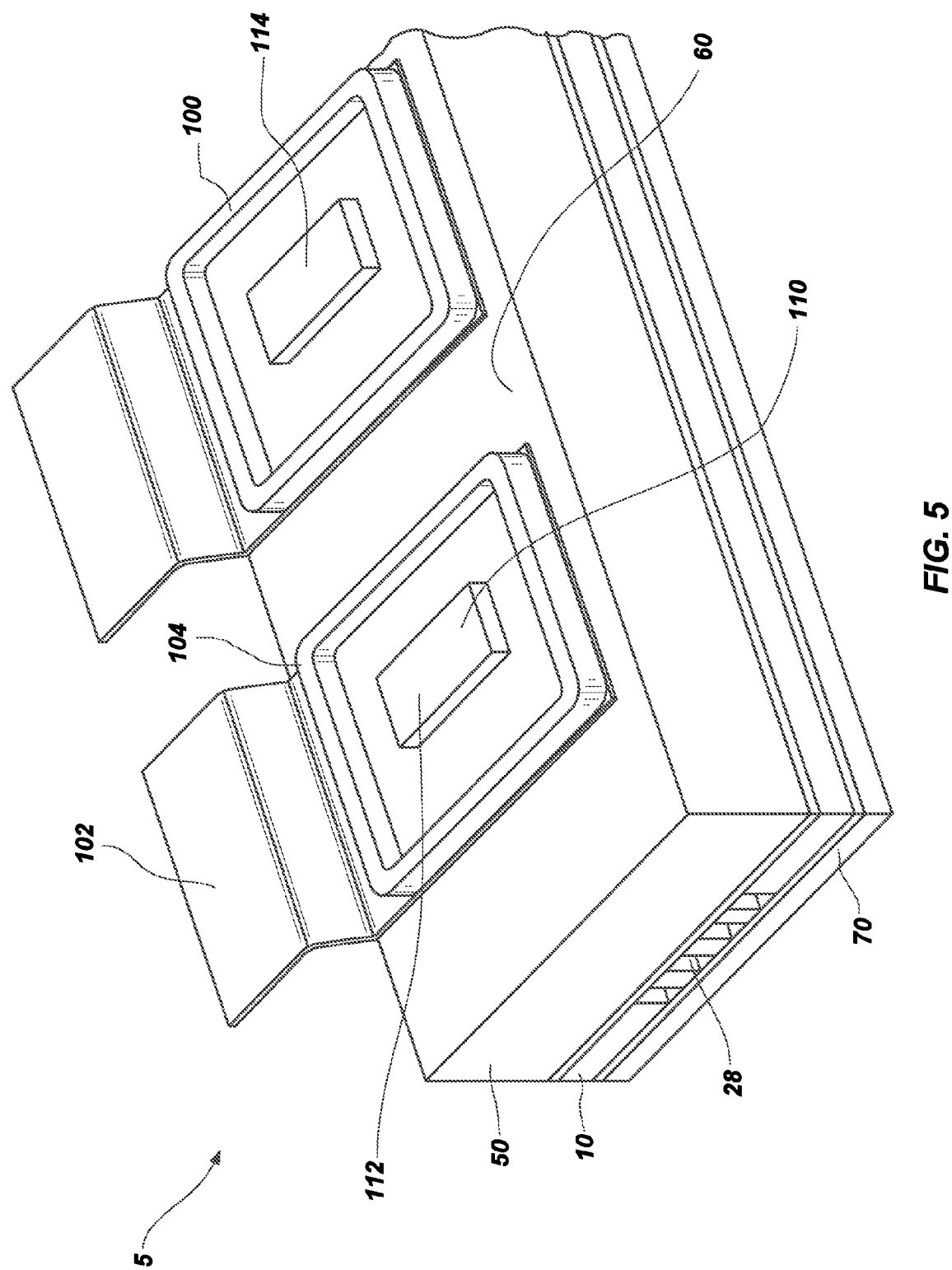
FIG. 5 is a schematic, perspective illustration of an additional step in the manufacturing process of a flexible optical interconnect, in accordance with an exemplary embodiment of the present invention.

The flexible optical interconnect 5 of the present invention can include optoelectronic (OE) modules 110 mounted to the top surface 60 of the stiffener plate 50 above the transverse openings, as illustrated in FIG. 5. The OE modules can include light detector arrays 114 having photo detectors configured to detect and couple the tapped portion of the optical signal out of the flexible optical bus 10. The OE modules can also include emitter arrays 112 of light emitting devices, such as lasers or light emitting diodes, which are configured to broadcast an optical signal into the flexible optical bus. When the OE module is a light detector array, the lens array 90 (FIG. 4) can be used to focus the light from the beamsplitters into the photo detectors. When the OE module is a light emitter array, the lens array can collimate and/or focus the light from the lasers or LEDs before it reaches the beamsplitter or turning mirror array and is reflected into the hollow metal waveguides.

In an alternative embodiment, the lens arrays and beamsplitter arrays can be attached directly to the OE assemblies, and the entire optical tap assembly can be installed in the flexible optical interconnect as part of the OE assembly process.

The OE modules 110 can be incorporated into larger OE assemblies 100 that can also be fabricated from flexible circuit board material, and which can include integrated electronic circuits, electrical input/output contacts fabricated into a flex tail 102, and a connector ring or backing plate 104 for attaching the OE assembly to the stiffener plate. The OE assemblies can be attached to the stiffener plate 50 with adhesives, screws, laser welding, etc., after being passively aligned using registering features 62, such as locating holes, notches, pins, etc., formed in the top surface 60 of the stiffener plate. (See FIGS. 2-4). The OE assemblies can also be actively aligned using vision systems and other methods.

In one aspect of the present invention, the OE assemblies 100 can be fabricated from the same flexible, polyimide dielectric material as the flexible optical bus 10 and the stiffener plate 50, leading to all the components of the flexible optical interconnect sharing the same coefficient of thermal expansion (CTE). With a common CTE, relative movement between components within the interconnect is substantially reduced during thermal cycling, and alignment of the optical train is preserved. As a result, system integrity and performance can be significantly improved over time as both the electronic devices integrated into the OE assemblies and the optical interconnect expand and shrink together.

Figure 6:
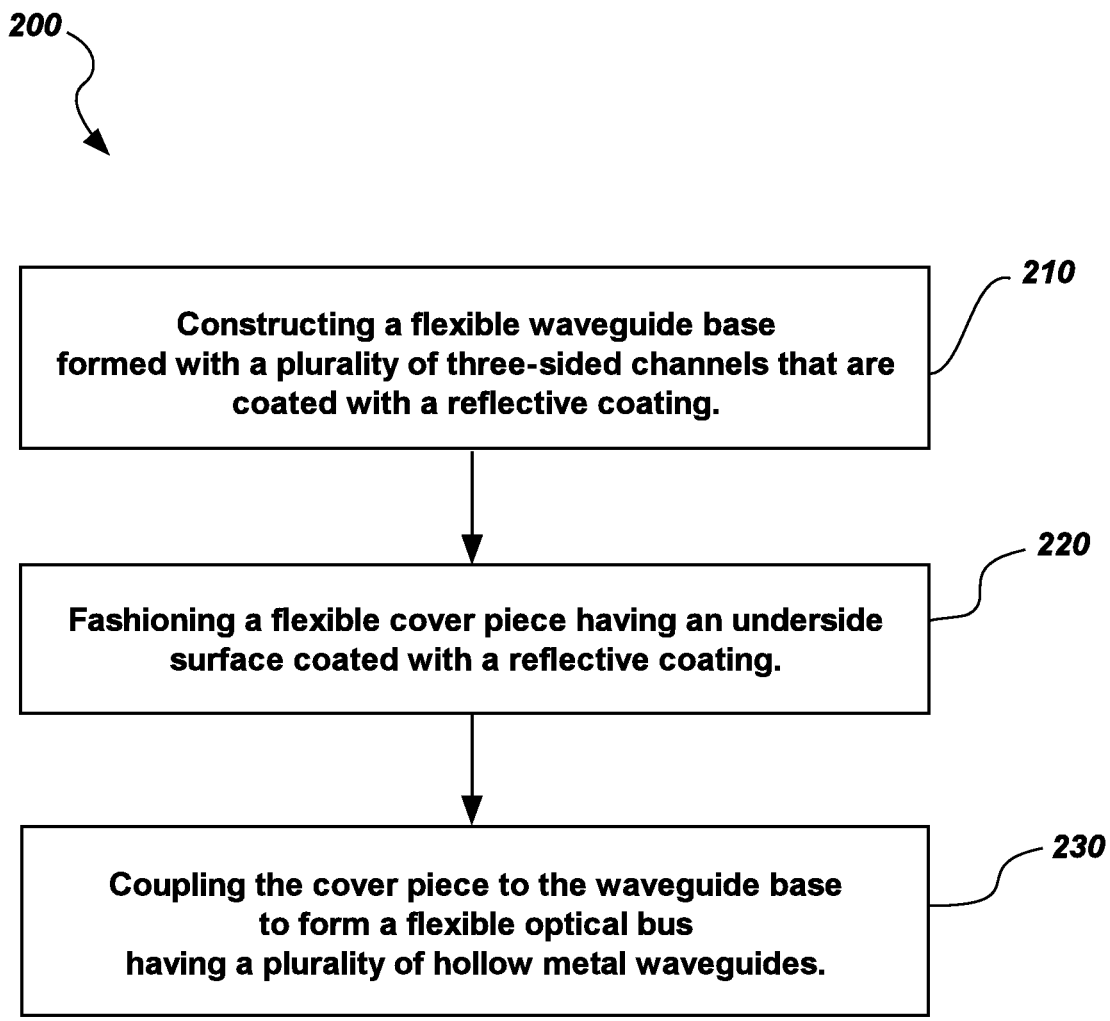
FIG. 6 is a flow chart depicting a method for manufacturing a flexible optical bus, according to an exemplary embodiment of the present invention.

Illustrated in FIG. 6 is a flow chart depicting a method 200 for making a flexible optical bus, according to an exemplary embodiment of the present invention. The method includes the operation 210 of constructing a flexible waveguide base having a plurality of three-sided channels formed therein. The three-sided channels can have a square cross-section in which the depth of each channel in the waveguide base is equal to its width. Alternatively, each channel can have a rectangular cross section. The sides and bottom of the plurality of channels can be covered with a smooth and reflective metallic coating, such as a nickel gold alloy. The waveguide base can be constructed from flexible dielectric material, including a polyimide such as DuPont's Kapton®, and can be manufactured using the same high volume manufacturing methods used in flexible PCB fabrication.

Figure 7:
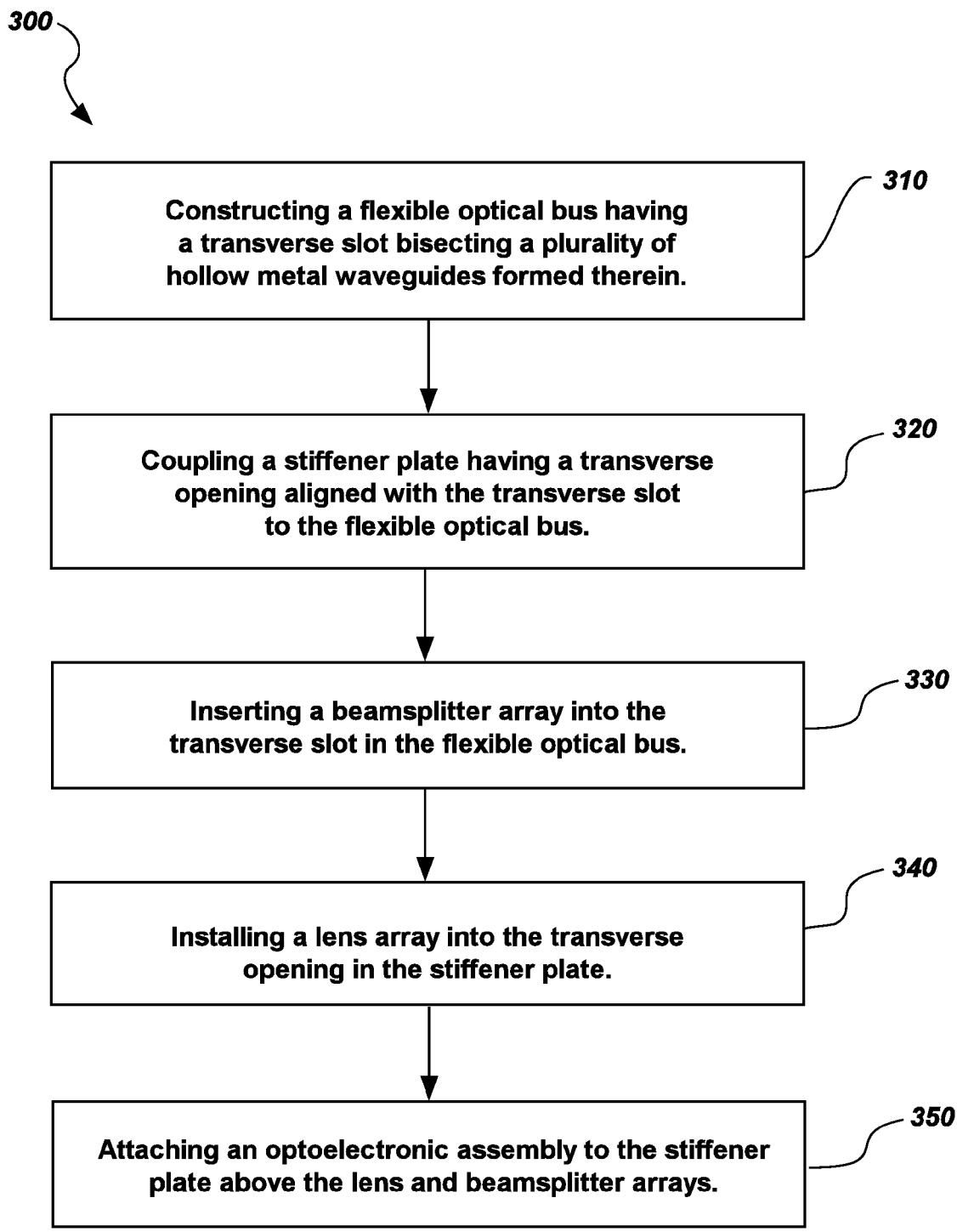
FIG. 7 is a flow chart depicting a method for manufacturing a flexible optical interconnect, according to an exemplary embodiment of the present invention.

The method further includes the operation 220 of fashioning a flexible cover piece. In one embodiment the cover piece can be formed from the same flexible dielectric material. The cover piece can be substantially flat and have a length and breadth substantially equivalent to the waveguide base. The underside of the cover piece can be covered with a smooth and reflective metallic coating, so that when the cover piece is coupled 230 to the waveguide base, the plurality of three-sided channels and the cover piece form a plurality of hollow metal waveguides having interior surfaces coated with a smooth and highly reflective metallic finish. Having a highly reflective finish on each of the four interior walls of the flexible waveguide allows an optical beam to propagate down the waveguide even when it is flexed to a degree that the optical signal has multiple contacts with interior walls. In this manner, the flexible optical interconnect of the present invention can transmit an optical signal up to 50 cm, which range is significantly greater than that allowed by solid core waveguides, and enables computer engineers to configure the optical circuits without undue restrictions to chip and circuit board placement Shown in FIG. 7 is a flow chart depicting a method 300 for manufacturing a flexible optical interconnect, according to an exemplary embodiment of the present invention. The method includes the operation 310 of constructing a flexible optical bus, as described in FIG. 6 hereinabove, with a plurality of hollow metallized waveguides formed therein. The flexible optical bus can have multiple transverse slots formed along its length, which slots pass through both the cover piece and waveguide base while bisecting the plurality of hollow metal waveguides. Crosswise slots in both the waveguide base and cover piece can be cut with a mechanical router or formed using other PCB manufacturing techniques before coupling to the two elements together, so as to prevent shavings, untrimmed edges or other irregularities from blocking a hollow metal waveguide or damaging the reflective metallic coating as the result of cutting the transverse slots after assembly of the optical bus.

With the flexible optical bus serving as the core member, the method further includes coupling 320 a stiffener plate to the optical bus to provide structural support and protection, as well as attachment sites for additional optical components. The stiffener plate can be fabricated from one or more layers of flexible dielectric material, but with a greater thickness than the waveguide base or cover piece. Additionally, the stiffener plate can have one or more pre-formed transverse openings which align with the transverse slots in the flexible optical bus to form vertical passageways perpendicular to the horizontal plane of the hollow metal waveguides. The transverse openings in the stiffener plate can have recesses or pockets formed into their sides to accommodate additional optical components, while the top surface of the stiffener plate can include locating holes, notches, pins or other registering features that can be used to attach and passively align other optical devices.

The method depicted in FIG. 7 further includes the operation of inserting 330 a beamsplitter array into the transverse slot in the flexible optical bus, such that the beamsplitter array is positioned in the slot to intersect any optical signal traveling through the optical waveguides. The beamsplitters in the array can be configured to reflect a portion of the optical signal out of the plane of the hollow metal waveguides and up the transverse opening in the stiffener plate, while still allowing a remainder of the optical signal to continue down the optical bus to the next tap location. The beamsplitter array can also be used to couple an optical signal emitted from above back into the optical bus.

The beamsplitter array can be installed using a variety of methods. In one embodiment of the present invention, the beamsplitter arrays can be inserted in the transverse slots by mounting each beamsplitter array into a tap frame projecting from a tap base strip. The tap base strip can have similar dimensions for its length and width as the flexible optical bus, and can also be made from the flexible dielectric material or from molded plastic, stamped metal, etc. The tap frames projecting from the tap base strip can be hollow in order to hold a beamsplitter array inside, and can have both front and back side openings and top openings to allow the optical signal to reach the beamsplitter array and be transmitted through or reflected upwards.

The tap base strip, tap frames, and beamsplitter arrays can be assembled together form a tap assembly which can then be attached to the surface of the flexible optical bus opposite the stiffener plate. The tap base strip can be coupled flush against the outer surface of the optical bus, with each tap frame and beamsplitter array sliding into a transverse slot and reaching a depth where the beamsplitter array will intersect the optical beam.

The method can further include installing 340 a lens array into a pocket formed in the transverse opening in the stiffener plate above the beamsplitter array. The lens array can be used to condition the tapped optical signal as it passes through the transverse opening. For instance, if the optical signal is passing out of the hollow metallized waveguides, the lens array can focus the light from the beamsplitters into an optical detector. If the optical signal directed into the hollow metallized waveguides is transmitted from a beam emitter, such as a laser, LED or equivalent light source, the lens array can collimate the light before it is coupled into the waveguides through the beamsplitter array. The pockets can be configured to seat the lens arrays at a depth to capture the optical beam as it passes through the transverse opening. The pockets can also be configured to, passively align the lens array to the beamsplitter array below with registration structures such as alignment pins, notches, the walls of the pocket, and so forth.

The method can further include attaching 350 an optoelectronic assembly to the stiffener plate above the lens and beamsplitter arrays to complete the optical train between the optical bus and the optoelectronic devices. The optoelectronic (OE) assembly can comprise optoelectronic modules such light detector arrays with photo detectors configured to detect the tapped portion of the optical signal out of the flexible optical bus. The OE assembly can also include light emitter arrays configured to transmit an optical signal into the flexible optical bus. The OE assembly can be attached and passively aligned to the lens array and beamsplitter array below using registering features such as locating holes, notches, pins, etc., formed in the top surface of the stiffener plate. The OE assembly can also be actively aligned using vision systems and other methods, as can be appreciated.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims.

What is claimed is:

1. A flexible optical interconnect comprising:
a waveguide base formed from a flexible dielectric material and having at least one three-sided channel formed therein, wherein each side of the at least one three-sided channel is coated with a reflective metallic coating; and
a cover piece formed from the flexible dielectric material and coated with a reflective metallic coating on an underside thereof, wherein the cover piece is coupled to the waveguide base to form a flexible optical bus having at least one hollow metallized waveguide formed therein and at least one transverse slot formed therein, the at least one transverse slot forming an aperture bisecting the at least one hollow metallized waveguide, and wherein the at least one hollow metallized waveguide is configured to carry an optical signal.

2. The optical interconnect of claim 1, further comprising at least one beamsplitter array configured for insertion into the at least one transverse slot, wherein the beamsplitter array is positioned inside the aperture bisecting the at least one hollow metallized waveguide to reflect a tapped portion of the optical signal out of the flexible optical bus.

3. The optical interconnect of claim 2, further comprising a stiffener plate formed from the flexible dielectric material and coupled to the flexible optical bus, the stiffener plate having at least one transverse opening aligned with the at least one transverse slot.

4. The optical interconnect of claim 3, further comprising an optoelectronic assembly physically coupled to the stiffener plate and optically coupled to the tapped portion of the optical signal through the at least one transverse opening.

5. The optical interconnect of claim 4, wherein the stiffener plate provides for passive alignment of the optoelectronic assembly to the beamsplitter array.

6. The optical interconnect of claim 4, wherein the optoelectronic assembly further comprises a light detector array, wherein the light detector array is configured to detect the tapped portion of the optical signal from the flexible optical bus.

7. The optical interconnect of claim 6, wherein the at least one transverse opening in the stiffener plate further comprises a pocket for holding a lens array, and wherein the lens array is configured to focus the tapped portion of the optical signal from the flexible optical bus into the light detector array.

8. The optical interconnect of claim 7, wherein the pocket provides for passive alignment of the lens array to the beamsplitter array.

9. The optical interconnect of claim 4, wherein the optoelectronic assembly further comprises a light emitter array, wherein the light emitter array is configured to couple an emitted optical signal into the flexible optical bus.

10. The optical interconnect of claim 9, wherein the at least one transverse opening in the stiffener plate further comprises a pocket for holding a lens array, and wherein the lens array is configured to collimate an optical signal traveling from the light emitter array into the flexible optical bus.

11. The optical interconnect of claim 10, wherein the pocket provides for passive alignment of the lens array to the beamsplitter array.

12. The optical interconnect of claim 1, wherein the flexible dielectric is a polyimide.

13. The optical interconnect of claim 1, wherein the reflective metallic coating comprises a layer of nickel gold alloy.

14. A method of forming a flexible optical bus comprising:
constructing a flexible waveguide base having a plurality of parallel channels formed therein, wherein the plurality of channels are coated with a reflective metallic coating;
fashioning a flexible cover piece having an underside coated with the reflective metallic coating, the cover piece comprising at least one slot transverse with respect to the plurality of parallel channels to form an aperture; and
coupling the cover piece to the waveguide base to form a flexible optical bus having a plurality of hollow metallized waveguides formed therein and configured to transmit an optical signal.

15. A method of forming a flexible optical interconnect comprising:
constructing a waveguide base, the method further comprising:
providing a base strip of flexible dielectric material;
forming a plurality of parallel three-sided channels in the base strip;
coating each side of each of the plurality of channels with a reflective metallic coating; and
forming at least one crosswise base slot perpendicular to the three-sided channels, and wherein the at least one crosswise base slot bisects the plurality of three-sided channels;
fashioning a cover piece, the method further comprising:
providing a cover strip of flexible dielectric material;
coating an underside of the cover strip with a reflective metallic coating; and
forming at least one crosswise cover slot; and
coupling the cover piece to the waveguide base to form a flexible optical bus having a plurality of hollow metallized waveguides formed therein and configured to transmit an optical signal, and wherein the at least one crosswise cover slot aligns with the at least one crosswise base slot to form at least one transverse slot in the flexible optical bus, and further wherein the at least one transverse slot forms an aperture bisecting the plurality of hollow metallized waveguides.

16. The method of claim 15, further comprising coupling a stiffener plate to the flexible optical bus, wherein the stiffener plate has at least one transverse opening aligned with the at least one transverse slot.

17. The method of claim 16, further comprising inserting a beamsplitter array into the at least one transverse slot, and positioning the beamsplitter array inside the aperture bisecting the plurality of hollow metallized waveguides to reflect a tapped portion of the optical signal out of the flexible optical bus.

18. The method of claim 17, further comprising inserting a lens array into a pocket formed in the at least one transverse opening in the stiffener plate, and aligning the lens array to the beamsplitter array to optically couple the tapped portion of the optical signal into an optoelectronic assembly.

19. The method of claim 18, further comprising forming the pocket with a registering structure to passively align the lens array with the tapped portion of the optical signal.

20. The method of claim 18, further comprising actively aligning the lens array with the tapped portion of the optical signal.

21. The method of claim 17, further comprising attaching an optoelectronic assembly to the stiffener plate above the at least one transverse opening, and aligning the optoelectronic assembly to the beamsplitter array to optically couple the tapped portion of the optical signal through the at least one transverse opening into the optoelectronic assembly.

22. The method of claim 21, further comprising forming the stiffener plate with a registering structure for passively aligning the optoelectronic assembly with the tapped portion of the optical signal.

23. The method of claim 21, further comprising actively aligning the optoelectronic assembly with the tapped portion of the optical signal.

* * * * *